United States Patent
Barton

(10) Patent No.: US 7,118,235 B2
(45) Date of Patent: *Oct. 10, 2006

(54) CONCEALED SAFETY LIGHTING DEVICE

(76) Inventor: Robert A Barton, 56 Barbara Jean St., Grafton, MA (US) 01519

( * ) Notice: Subject to any disclaimer, the term of this patent is extended or adjusted under 35 U.S.C. 154(b) by 0 days.

This patent is subject to a terminal disclaimer.

(21) Appl. No.: 10/710,189

(22) Filed: Jun. 24, 2004

(65) Prior Publication Data
US 2004/0218379 A1 Nov. 4, 2004

Related U.S. Application Data

(63) Continuation-in-part of application No. 10/249,723, filed on May 3, 2003, now Pat. No. 6,805,469.

(51) Int. Cl.
F21V 19/04 (2006.01)

(52) U.S. Cl. .......................... 362/20; 362/95; 362/365; 362/802

(58) Field of Classification Search ................. 362/95, 362/20, 365, 802
See application file for complete search history.

(56) References Cited

U.S. PATENT DOCUMENTS

| | | | | |
|---|---|---|---|---|
| 2,134,696 A | * | 11/1938 | Bigman | 362/95 |
| 2,246,613 A | * | 6/1941 | Bigman | 362/95 |
| 2,434,065 A | * | 1/1948 | Courtney | 362/95 |
| 2,494,560 A | * | 1/1950 | Kaupp | 362/95 |
| 2,512,975 A | * | 6/1950 | Sherrard | 362/95 |
| 2,612,597 A | * | 9/1952 | Sherrard | 362/95 |
| 3,265,888 A | * | 8/1966 | Adolphson, Jr. | 362/95 |
| 3,588,489 A | * | 6/1971 | Gaines | 362/95 |
| 3,739,226 A | * | 6/1973 | Seiter et al. | 315/86 |
| 4,418,979 A | * | 12/1983 | Takashima | 439/490 |
| 4,514,789 A | | 4/1985 | Jester | 362/95 |
| 5,473,517 A | * | 12/1995 | Blackman | 362/95 |
| 5,713,655 A | | 2/1998 | Blackman | 362/95 |
| 5,833,350 A | * | 11/1998 | Moreland | 362/95 |
| 6,000,807 A | | 12/1999 | Moreland | 362/95 |
| 6,010,228 A | * | 1/2000 | Blackman et al. | 362/95 |
| 6,547,411 B1 | * | 4/2003 | Dornbusch | 362/95 |
| 6,805,469 B1 | * | 10/2004 | Barton | 362/365 |

OTHER PUBLICATIONS

Pass & Seymour, "New Trademaster Decorator Combination Devices Introduced by Pass & Seymour/Legrand" Apr. 3, 2003 Press Release, 1 pg.—(Attached). Find on-line article=http://passandseymour.com/news/view.cfm?id=162.

* cited by examiner

Primary Examiner—Y. My Quach-Lee
Assistant Examiner—Ismael Negron

(57) ABSTRACT

A concealed safety light is described where the light source is integrated and mounted into a switch or power outlet wiring device form factor (20,21,22) to replace conventional electric wiring devices. The light source (10) is controlled by a power and control circuit (90, 790) that derives power from the primary power supply or an alternate power supply. The circuit can detect light levels and turn on the light source when it is dark and also detect power failures to turn on the safety light in the event of a power failure using the alternate power supply The safety light is also capable of responding to an alarm condition from other systems. The resulting safety light is conceyaled in a standard wiring junction box and trimmed with a wall cover plate in the same way as conventional electric wiring devices, allowing it to be concealed while in plain view and provide safety lighting in a variety of ways including power failure, night light and alarm conditions.

18 Claims, 7 Drawing Sheets

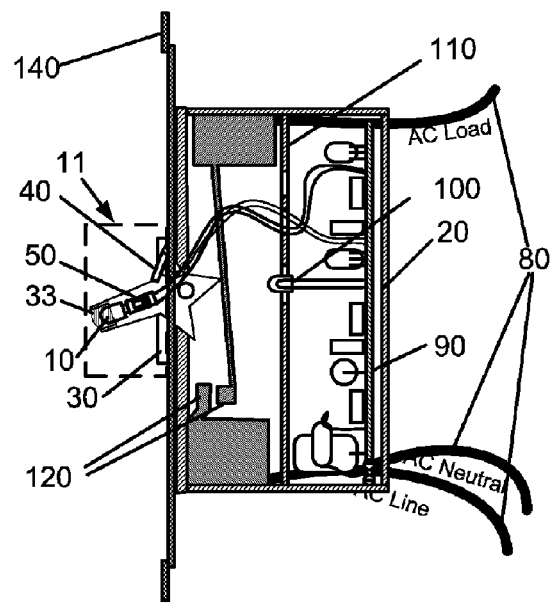

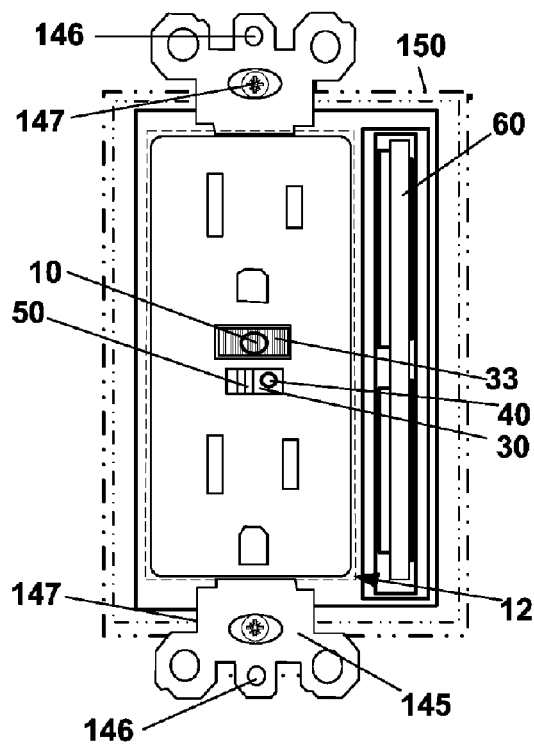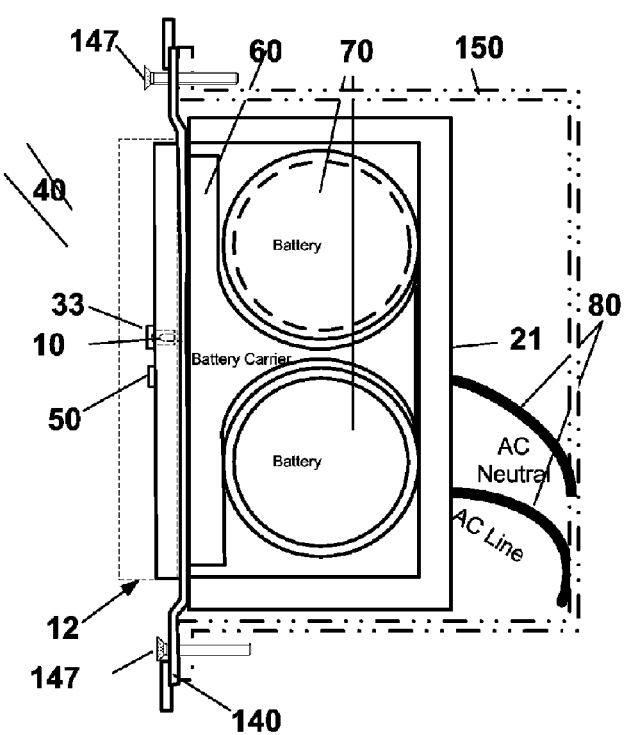
Fig. 5A  Fig. 5B
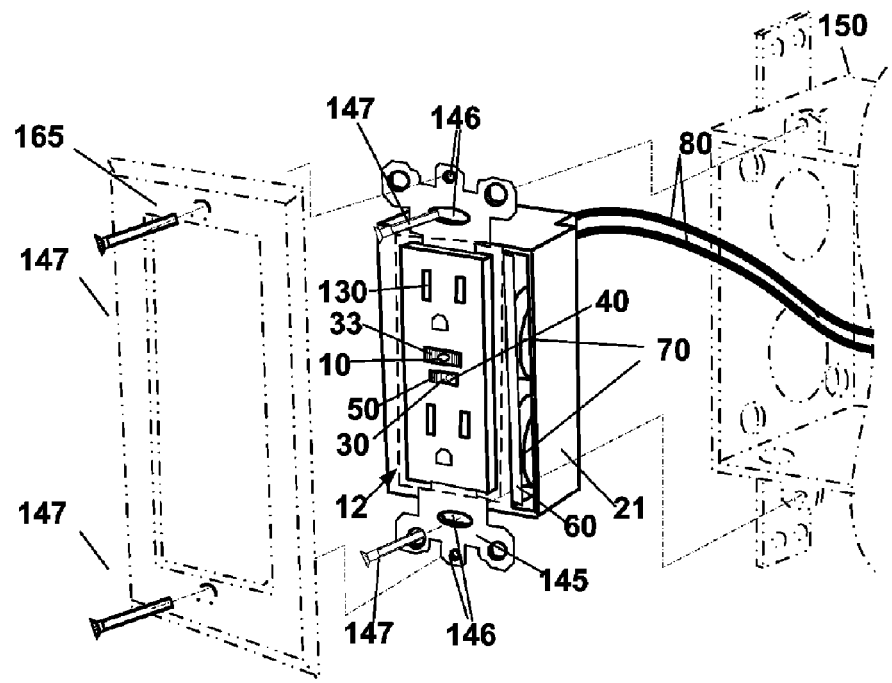
Fig. 5C

CONCEALED SAFETY LIGHTING DEVICE

CROSS REFERENCE TO RELATED APPLICATIONS

This application is a continuation-in-part of application Ser. No. 10/249,723 filed on May 3, 2003, now U.S. Pat. No. 6,805,469.

BACKGROUND OF INVENTION

The present invention relates generally to alternate safety lighting devices and, more specifically, to a safety lighting device that is combined with standard wall switches and power outlets such that they are unobtrusive in their appearance while capable of providing nighttime lighting during power failures.

DESCRIPTION

Emergency lighting devices are typically installed in such obvious ways that they interfere with visible design and decor of a living space or workspace. This often affects a person's decision on whether or not to install them. Making the emergency lighting device inconspicuous will result in more installations and thus safer homes and workplaces.

Some amount of light is necessary during the night time to allow people to move about safely. The reduction in size of high output light sources that consume small amounts of power, make integrating them into common devices possible without substantially altering the form and function of the original device. The amount of light emitted from these light emitting devices such as Light Emitting Diodes or Laser diodes allow people to see objects and pathways that might otherwise not be visible in the darkness.

Nightlights and power failure lights provide this needed illumination. Therefore, the safety light of the present invention consists of a light source combined with electrical wiring devices in such a way as to allow the light source to illuminate the room area through the openings of the electrical wiring device's wall cover trim plates. Openings in wall cover trim plates are necessary to expose the working features of light switches and power outlets while the cover plate hides the rough installation of the utility work box. The present invention takes advantage of the common appearance of light switches and sockets behind wall trim cover plates to effectively conceal the existence of the safety light, thereby rendering it unobtrusive. The nighttime lighting is made available when darkness occurs during a power failure using a light detection mechanism as well as a power detection mechanism. The present invention provides enhanced safety as a nightlight by eliminating the heat normally generated by the incandescent lamps found in most nightlights today. The 4 watt lamps get hot enough to burn a child's fingers and are a potential fire hazard. Improved safety for night lights is also accomplished in the present invention because it is permanently installed with screws behind a cover trim plate, eliminating the possibility that a child could remove it and come in contact with the high voltage AC.

Candles are often used during power failures that occur in the nighttime hours of darkness. The use of candles presents a fire safety risk and the present invention provides a safe alternative method of lighting an area to enable safe movement during such power failures. The present invention improves safety by minimizing or eliminating the need for using candles during power blackouts.

DESCRIPTION OF PRIOR ART

Similar prior art backup lighting devices that light up when a power failure occurs are often embodied in the form of a wall cover plate that surrounds an existing switch or AC outlet. Their embodiments are designed to mechanically and electrically attach to the existing switch or AC outlet either by direct attached wiring, plugs, or wireless means. Prior art devices do not disclose an apparatus combined with an electric wiring device such as a common wall switch device or an AC outlet device, nor do they address concealment of the device.

Prior art does not perceive or address the problem of being conspicuous, thus limiting the locations where one would install such devices. The present invention looks like and may also perform the function of the common wall switch or AC power outlet. It installs into the standard electrical workboxes and provides the function of the safety light. It is concealed upon the installation of a wall cover plate over it, thus overcoming the problem of being conspicuous. Additionally, no prior art addresses the availability and long term readiness of the alternate power source with a design that includes easily replaceable long shelf life batteries.

In U.S. Pat. No. 3,739,226 Seiter describes an emergency light for mounting to an electrical wall socket. The apparatus for emergency lighting plugs into an AC wall outlet. It is easily visible and conspicuous in its display and mounting mechanism.

In U.S. Pat. No. 4,514,789 Jester describes an illuminated light switch plate with LED and oscillator circuit to replace a wall cover plate. It is intended to locate the wall switch in the dark It is a cover plate that has no power failure detection or backup lighting mechanism.

In U.S. Pat. Nos. 5,473,517, 5,713,655, and 6,010,228 Blackan=describes a housing with an emergency safety lighting apparatus that replaces the wall cover plate and mechanically attaches to the wall switch device using the same screw mounting holes used by the former wall cover plate. It does not perform the function of the switch itself. It is large, plainly visible and protrudes from the wall as a result of its size, shape and the bulk of its housing.

In U.S. Pat. Nos. 5,833,350 and 6,000,807 Moreland describes a switch cover plate that houses the apparatus for emergency lighting. In U.S. Pat. No. 4,631,649 McCue describes a plug-in emergency light fixture that plugs into a wall receptacle and is semi-permanently mounted by screwing it to the receptacle. None of these are part of the receptacle and they do not remain concealed or inconspicuous during the times when AC power is available.

Prior art generally discloses backup power failure lighting devices that either plug into a power outlet or replace the cover plate that surrounds common AC wall switches and outlets. It does not disclose a concealed device that installs in place of the common wall switch or AC power outlet devices as does the present invention. Prior art also does not disclose night lights that are concealed within electrical wiring devices for the purpose of improving safety, reducing heat, reducing operating costs, and providing nighttime lighting in an unobtrusive manner. The present invention occupies the same physical space and may provide the function of a conventional switch or AC outlet, while simultaneously providing illumination to an area when darkness fills, with or without AC power being available thus rendering the present invention a concealed safety lighting device.

The object of the present invention is to conceal the safety light source within the same physical housing including the electrical workbox and cover plate used by a common switch or AC power outlet, thereby allowing the safety lighting device to be installed in many locations unobtrusively. The device is installed in place of a conventional switch or outlet and provides nighttime safety lighting whether AC power is available or not with minimal visible impact on the design or decor of the area where the device is installed.

SUMMARY OF INVENTION

The concealed safety lighting device provides night lighting regardless of the state of the local AC power availability. It provides night lighting using AC power when available, and it also provides power failure lighting when AC power is not available. Concealment of the safety light is accomplished by adapting a light source to emit light from a device shaped like a wall switch, dimmer or power outlet allowing the device to illuminate the room area through the openings of the wall cover plate for electrical devices. Portions of the surface of electrical wiring devices are exposed to allow users to have access to the functional capabilities of the device such as the switch or dimmer control actuator or to plug in an electric load into the power outlet receptacle.

A conventional wall cover plate is a device that is used to cover and seal the rough opening and hazardous wiring, and sometimes to decorate the installation of electrical devices. It may be separate from or an integrated part of the electrical wiring device. Classic, decorative or any wall cover plate that exposes the useable features of the electrical wiring device to the user allows a level of concealment while in plain view for the safety lighting device. Wall cover plates come in a variety of shapes and sizes and may be integral to the electrical wiring device. They are found in many locations and are in plain view on walls thus providing an unremarkable and concealed appearance for a safety light.

The present invention comprises an electrical wiring device controlling an electrical load such as a light switch, electric light dimmer, and power outlet, or similarly formed housing, a detection mechanism connected to a primary power source for powering a nightlight function or detecting the presence or lack of presence of the AC voltage, an alternate power source and a safety light source connected between the detection mechanism and the power sources. A light sensing mechanism determines when light should be turned on whether there is AC power available or not. A user control mechanism such as a switch or pushbutton is used to turn on and off or adjust brightness levels of the safety light and can be a multifunction control or simple on-off-test switch.

The housing is specifically shaped in the form of any conventional looking light switch, dimmer, power outlet, or a housing body having substantially the same shape as these conventional electrical wiring devices with or without the electric wiring device functionality. This housing shape with an integrated safety light source allows the installation of the safety light device in the same places as light switches, dimmers and power outlets. It may have a local alternate power source or remote power source depending on the specific model and safety light coverage required. Constructing the safety lighting device in the same form factor as conventional electrical wiring devices, regardless of whether they function as the original electric wiring device or not, provides the concealment and unobtrusive appearance characteristics of the present invention.

The detection mechanism monitors the availability of AC voltage and signals the safety light source to light up upon detection of an interruption of the voltage at the terminals of the power source. The device is capable of providing sufficient illumination of the area adjacent to the installed device by emitting light through the exposed face of the electrical wiring device. This is accomplished by mounting the light source within the body of the electrical wiring device and providing a light transmission means for the light to escape and diffuse into the adjacent area, such as, but is not limited to, a hole or void, lens system, or optical light pipe or fiber optic material. The light emitted into the room allows safe movement and other activities in the area for periods of approximately 24 hours or greater depending on the alternate power source selection.

The alternate power to the safety light device may be provided by rechargeable batteries or large value capacitors where power failures are more frequent, or non-rechargeable batteries where power failures may be infrequent by implementing a simple change to the DC power circuitry. The battery may be integrated with the device or remotely located. When integrated with the electric wiring device, a safely removable battery carrier for removing and replacing the batteries isolates the user from the normally hazardous AC power found in electrical wiring devices. A battery status indicator is implemented to alert the user when batteries need replacement or maintenance. A light sensor adjusts the intensity of the safety light according to available lighting conditions such as daylight, thereby extending the battery life.

The present invention provides illumination using the available AC power and thus providing a nightlight function using the concealed light source. The nightlight safety lighting is also controlled by the light sensor in the same way as the power failure safety light. This arrangement, along with using a low power safety light source, for example an LED, provides low cost energy saving illumination and little or no heat when compared with standard incandescent nightlights.

Multiple concealed safety light devices may be installed and controlled by electrically communicating with a single system module having a detection and signaling mechanism to provide safety lighting economically. A single detection mechanism and a single alternate power source are electrically coupled to the light sources concealed in multiple safety lighting devices. The safety lighting devices may be stand-alone, fully functional safety lighting devices or cost reduced models having few local controls and no local battery. This safety light system reduces cost when several of the concealed safety lights are installed in a living space providing broad coverage in a dwelling and can be referred to as a whole house system. The units may communicate with the central system module through low power DC wiring, or if local battery is in the safety lighting devices, the communication may be accomplished using coded signals such as X10 over the primary power wiring. This whole house system may have an interface to allow fire, smoke, gas, intrusion or other alarms to enable the concealed safety lights to visually alert the occupants of the alarm condition. This allows persons in the immediate area, including those with hearing impairment, to be alerted.

In summary, the concealed safety lighting device of the present invention provides its users increased safety by providing illumination in the form of night lighting, power failure lighting, or alarm condition visual warning indication and is concealed in an electrical wiring device in such a way that is acceptable to install without detracting from room design and decor.

A primary object of the present invention is to provide a device that is neither visible nor recognizable primarily as a device for providing safety lighting and has little or no visible impact on interior space designs, effectively concealing it in plain view, and thus overcoming the shortcomings of prior art devices.

Another object of the present invention is to be installable in all the same places as electrical wiring devices independent of the type of wall cover plate used to finish off the installation of electrical wiring devices.

Another object of the present invention is to provide a device for providing alternate safety lighting for an extended period of time, while remaining smaller than most prior art.

Another object of the present invention is to provide a device for providing alternate safety lighting that is able to detect the occurrence of a power failure.

An additional object of the present invention is to provide a device for providing alternate safety lighting that is able to provide area illumination from the concealed safety light source upon detection of a power failure, thereby allowing safe passage and mobility by persons in the nearby adjacent area.

A further object of the present invention is to provide a device for providing alternate safety lighting that includes an indicator to warn the user of a low battery condition that would limit or prevent the device from illuminating during a power interruption due to a drained alternate power source.

Another object of the present invention is to provide a device for providing alternate safety lighting in an inconspicuous manner to multiple room areas during power failures by installing it in many locations throughout a house or building equipped with AC power.

A further object of the present invention is to provide visual warning to alert users that an alarm condition exists from smoke, fire, gas, intrusion, or other alarm systems.

A further object of the present invention is to provide a concealed safety lighting device that includes a light detection mechanism for reducing the intensity of the emergency light when other light sources such as daylight are available to extend the life of the alternate power source during extended power outages or determining when nightlight operation should begin.

A still further object of the present invention is to provide a concealed safety lighting device that includes a mechanism for selectively turning the safety light off during a power outage to conserve battery life if lighting is not needed in that area for a specific period of time.

Another object of the present invention is to provide a concealed safety lighting device with a safety light source that can be adjusted to different levels of brightness at the user's discretion.

Another object of the present invention is to provide a concealed safety lighting device that is activated and available for use with no specific action to be taken by the user.

A still further objective of the present invention is to provide safety lighting in the darkness regardless of the state and availability of AC power.

Another object of the present invention is to provide nighttime lighting when AC power is available for use as a nightlight in a concealed, unobtrusive manner allowing for a more child safe, non-removable night lighting device to take the place of the removable incandescent devices found today.

A still further object of the present invention is to provide a concealed safety lighting device that is economical in cost to manufacture resulting in end user costs that imply affordability allowing for immediate commercial use.

An additional object of the present invention is to be easy to install with no additional knowledge necessary than that needed to install or replace common AC power outlets or switch devices.

Numerous devices for providing alternate safety lighting have been provided in the prior art. For example, U.S. Pat. Nos. 4,631,649, 5,473,517, and 5833350 all are illustrative of such prior art. While these units may be suitable for the particular purpose to which they address, they would not be as suitable for the purposes of the present invention as heretofore described.

Additional objects of the present invention will appear as the description proceeds. A concealed safety lighting device providing illumination of an area during times of darkness, including times when there is a power failure or alarm condition is disclosed by the present invention. The light source is completely embodied in the form of standard AC switches and power outlets providing its concealment while in plain view. The concealed safety lighting device includes a power outlet, a switch, or a housing body having a form similar to an electrical wiring device form factor, one or more safety light sources for purposes of illumination, a local or remote power source, a local or remote detection circuit connected to the primary power source for detecting a voltage failure at the terminals of the primary power source, an alternate power source and safety light source connected between the detection circuit and the alternate power source and a means to transmit the light from the light source into the room area.

To the accomplishment of the above and related objects, this invention may be embodied in the form illustrated in the accompanying drawings, attention being called to the fact, however, that the drawings are illustrative only, and that changes may be made in the specific construction illustrated and described, within the scope of the appended claims.

BRIEF DESCRIPTION OF DRAWINGS

Various other objects, features and attendant advantages of the present invention will become more fully appreciated as the same becomes better understood when considered in conjunction with the accompanying drawings, in which like reference characters designate the same or similar parts throughout the several views. Many variations of the shape and function of the concealed safety tight are possible. For the purpose of demonstrating the versatility of the present invention, the figures and drawings depict several different examples of the variations. Other designs that can be concealed by an electrical wiring device cover plate are possible within the scope of the present invention.

FIG. 3a is a cutaway view of the AC switch embodiment showing the integration of the standard switch and the emergency power failure backup lighting device components. FIG. 3b shows a cutaway view of a decorative switch embodiment. FIG. 3c shows a cutaway view of a decorative power outlet and FIG. 3d shows a cutaway view of the housing having a protrusion shaped like a switch such that it protrudes through a wall cover plate.

FIGS. 5A, 5B, and 5C depict the concealed safety lighting device in the form of a decorative version of an AC power outlet, similar to the classic version depicted in FIGS. 2A, 2B and 2C.

DESCRIPTION OF THE REFERENCED NUMERALS

Figure 1A:
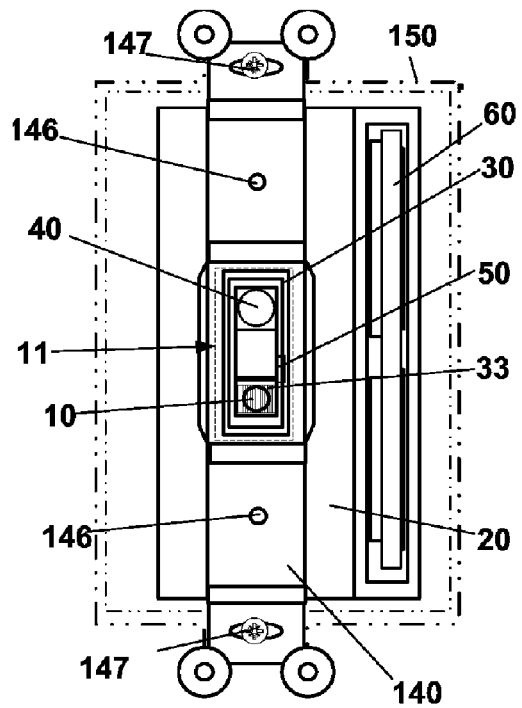
FIG. 1A is a front view and FIG. 1B is a side view of the apparatus in the form of an AC switch for providing concealed safety lighting of the present invention, indicating the placement of high intensity light source in an inconspicuous manner.

Turning now descriptively to the drawings, in which similar reference characters denote similar elements throughout the several views, the figures illustrate the concealed safety lighting device in different embodiments of the present invention. With regard to the reference numerals used, the following numbering is used throughout the various drawing figures.

10, 10'. Safety light source.
11. Normally exposed area of a switch visible after cover plate is installed.
12. Normally exposed area of the an outlet visible after cover plate is installed.
20. Switch device housing containing switch mechanism and safety lighting apparatus
21. Outlet device housing containing duplex power outlet mechanism and safety lighting apparatus.
22. Safety light housing in the form of a switch.
30. Clear or translucent body area to allow glow from indicator for low battery condition.
33, 33'. Light transmission means for safety light.
40, 40'. Ambient Light detector.
45. Clear or translucent body area to allow ambient light to strike sensor.
50, 55. On-Off-test switch user control.
60. Battery Carrier.
70, 770. Alternate power source battery.
80. External electrical connections.
90. Circuit board containing the components necessary to implement the power failure backup lighting mechanism, control power monitoring and actuator circuits.
100, 775. Low battery warning indicator.
110. Interior well of device housing separating the low voltage circuit board and the AC voltage switch mechanism.
120. Switch contacts.
130. Outlet receptacle contacts.
140. Switch Mounting bracket.
145. Outlet Mounting bracket.
146. Mounting holes.
147. Screw.
150. Electrical utility work box.
160. Switch cover plate.
165. Outlet cover plate.
410. Wire line comms circuit
420. Signal decode logic
700. System module.
740. Light Sensor.
750. AC power supply cord.
760. Safety light power signal circuit.
780. Alarm system interface connector.

Detailed Description

Figure 7:
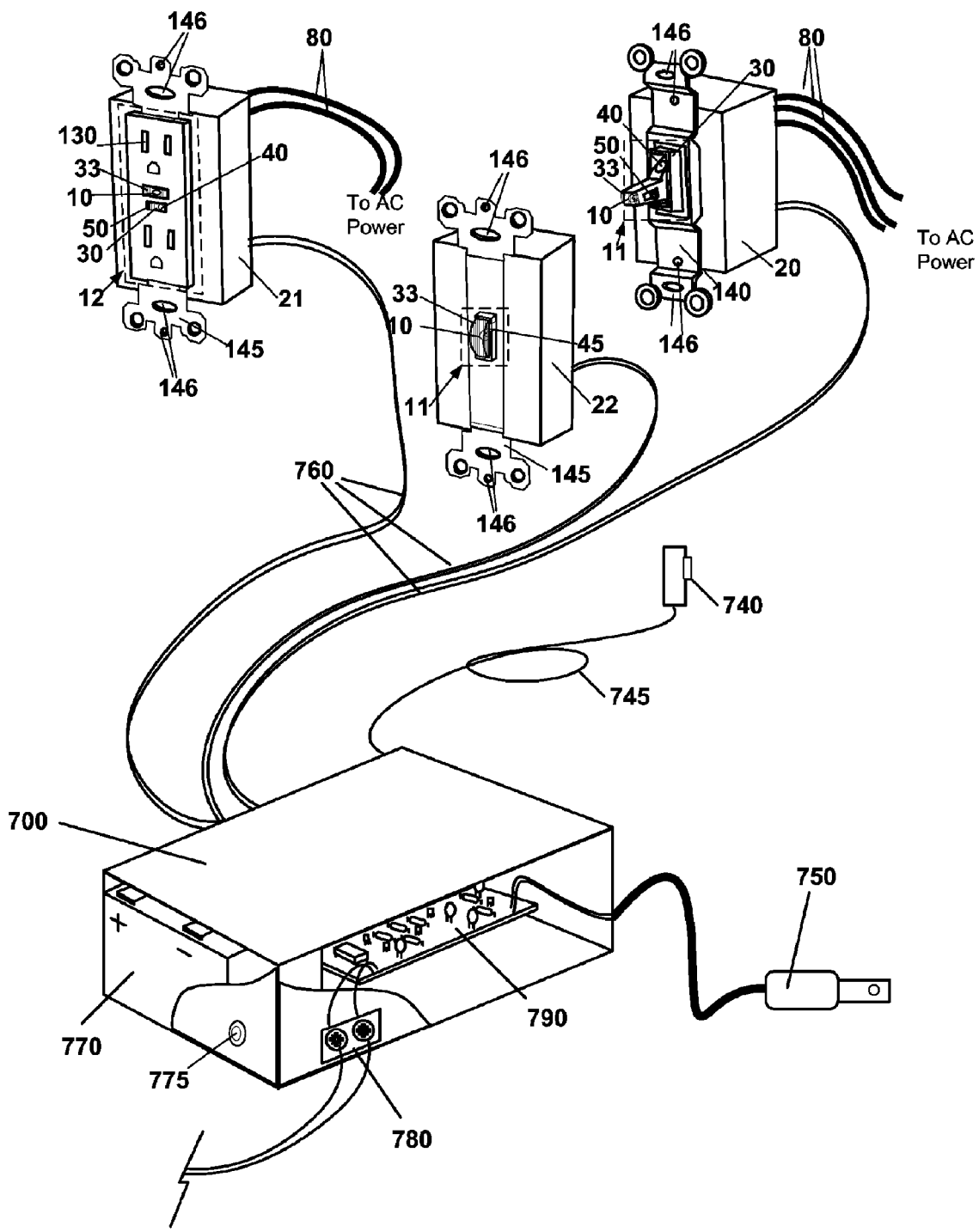
FIG. 7 depicts the elements of the concealed safety lighting device embodied as a whole house system showing the different versions of safety lighting devices that can be used.

Turning now descriptively to the drawings, in which similar reference characters denote similar elements throughout the several views, FIGS. 1A through 3 illustrate two implementations of the concealed safety lighting device of the present invention using classic styles of switches and outlets. Other implementations for the concealed safety lighting device using decorative or Decora wiring devices are shown in FIGS. 5A through 6C depicting how substantially similar their structure and function are in allowing them to conceal a safety lighting device. FIG. 7 shows a multi-unit whole house embodiment of the present invention.

Figure 1B:
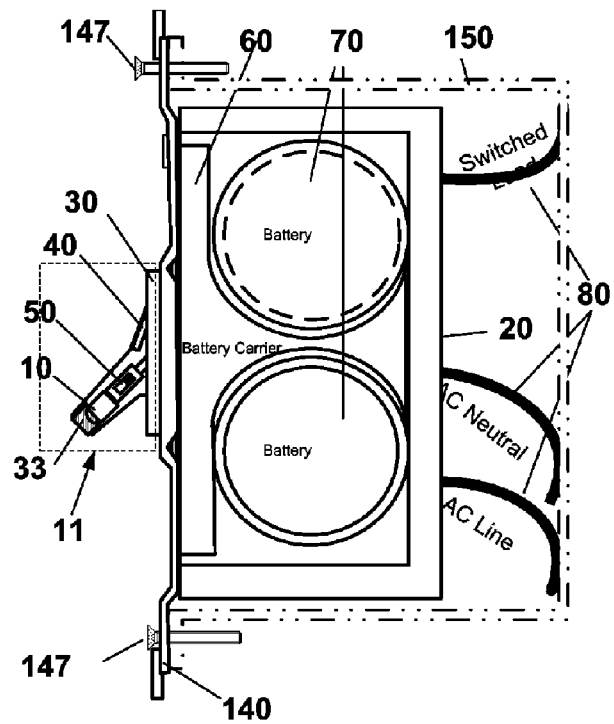
Figure 1C:
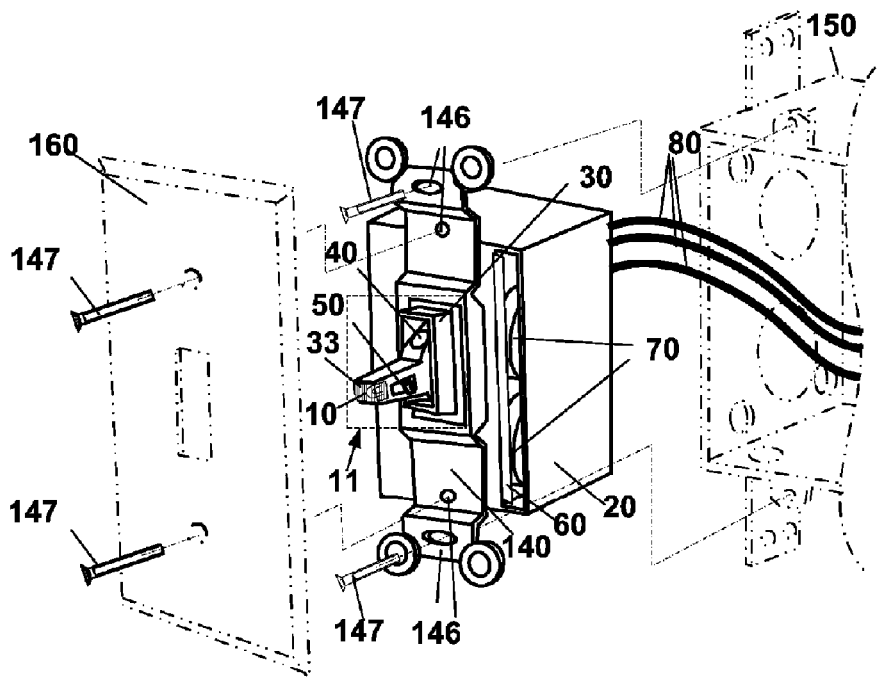
FIG. 1C shows a typical installation of the present invention in an electrical utility work box with the associated cover plate.

FIGS. 1A through 1C show the safety light source 10 embodied in the normally exposed area 11 of the switch actuator handle in such a way as to allow the light to escape from the actuator handle through the light transmission means 33 which remains visible after installing the switch cover plate 160. It also illustrates one method of installing the alternate power source battery 70 so as to allow users to change it when necessary by removing the switch cover plate 164) and extracting the battery using the battery carrier 60. The ambient light detector 44) is mounted in the normally exposed area 11 of the switch such a way as to sense surrounding light levels and adjust the level of power to the safety light source 10. The switch device housing 20 is attached to switch mounting bracket 140 having all the standard structure to allow installation into a standard electrical utility work box 150 and conventional switch cover plate 160 using screws 147 into mounting holes 146. The switch otherwise appears substantially the same as a standard AC switch when the switch cover plate 160 is attached, thereby covering the entire device installation. The external electrical connections 80 electrically connect to the switch contacts 120 providing normal AC switch function for the concealed safety Lighting device.

Figure 2A:
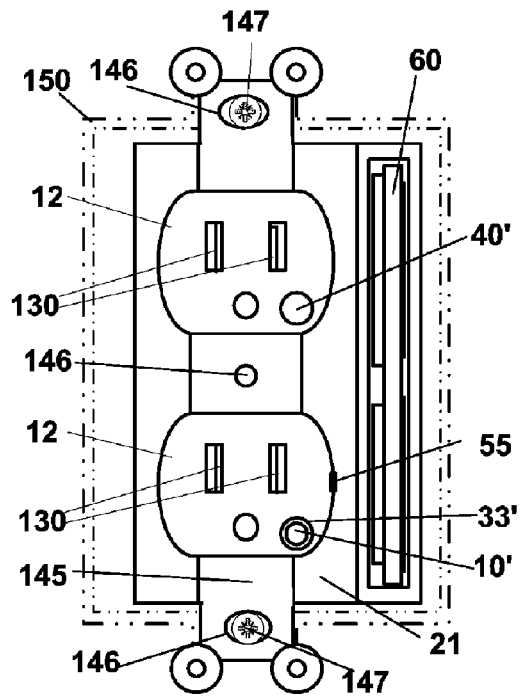
FIG. 2A is front view and FIG. 2B is a side view of the apparatus in the form of an AC power outlet for providing concealed safety lighting of the present invention.
Figure 2B:
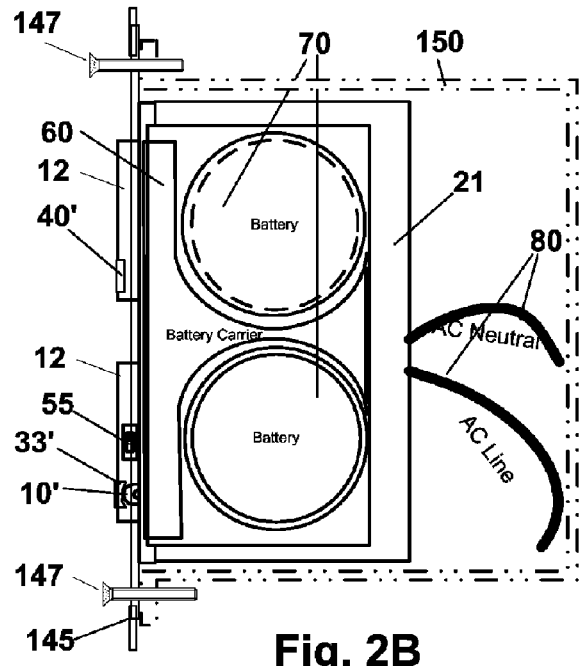
Figure 2C:
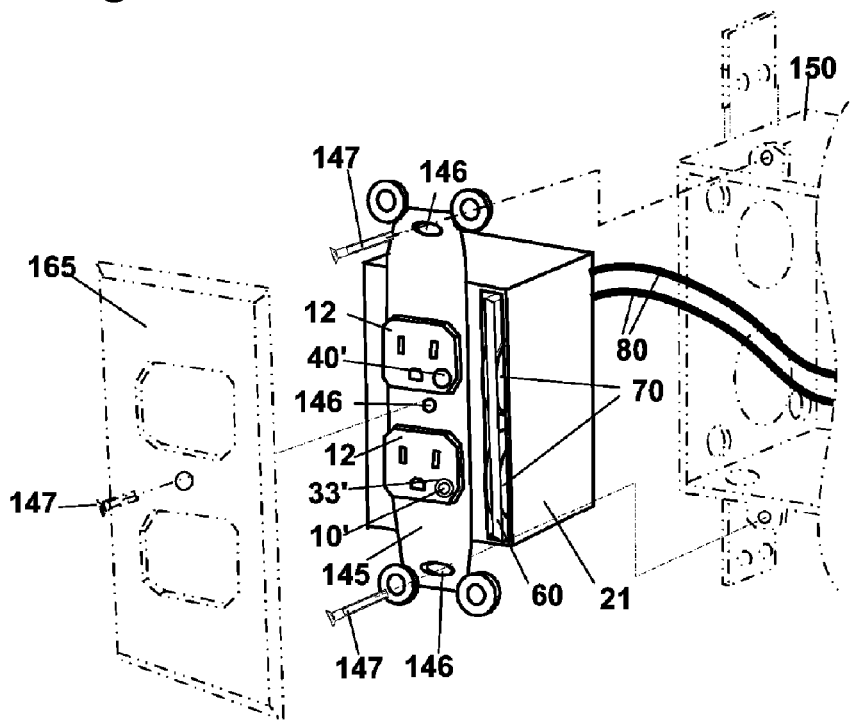
FIG. 2C shows a typical installation of the present invention in an electrical utility work box with the associated cover plate.

FIGS. 2A through 2C show the safety light source 10' embodied in the normally exposed area 12 of the outlet in such a way as to allow the light to escape through the light transmission means 33', from the outlet face and through the outlet cover plate 165. The ambient light detector 40' is mounted in the normally exposed area 12 of the outlet in such a way as to sense surrounding light levels and adjust the level of power to the safety light source 10 using screws 147 in mounting holes 146. The outlet device housing 21 is attached to outlet mounting bracket 145 having all the standard structure to allow installation into a standard electrical utility work box 150 and outlet cover plate 165. The external electrical connections 80 are electrically connected to the outlet receptacle contacts 130 providing normal AC power outlet function for the concealed safety lighting device.

FIG. 3a shows a side cutaway view of the backup lighting mechanism in the form of a classic light switch demonstrating one form that the body of the apparatus can take to contain all the components of the backup Lighting device. The external electrical connections 80 enter the switch device housing 20 and connect to the circuit board 90 and to the switch contacts 120. Wiring from the safety light source 10 and the ambient light detector 40 is routed through the interior wall 110 and connected to the circuit board 90. Low battery warning indicator 100 is mounted in such a way as to protrude through the interior wall 110 to allow the clear or translucent body area 30 to glow and be visible to the user. Switch contacts 120 perform the same function as normal load-controlling switch contacts and are unremarkable. The switch device housing 20 is of sufficient size to contain all standard switch mechanics plus the safety light mechanism herein described.

FIG. 3b shows a side cutaway view of a decorative model of a switch performing similar functions to the switch shown in FIG. 3a. In this version, the safety light source 10 is stationary and mounted to emit light through the light transmission means 33 allowing light to pass through the normally exposed area 11 of the switch. The ambient light detector 40 is mounted under the clear or translucent body area 45. Switch operation is otherwise unremarkable, closing switch contacts 120 to complete the AC voltage circuit path.

FIG. 3c shows a side cutaway view of a decorative power outlet. In this example, the safety light source 10 is mounted on the circuit board and uses a light pipe as a light transmission means 33 to convey the light through the normally exposed area 12 of the outlet. The clear or translucent body area 30 serves as a light pipe to carry external light to the ambient light detector 40 and also allows the light from the low battery warning indicator 100 to be visible to the user. Interior wall 110 separates the high voltage from the low voltage components. AC voltage enters the device through external electrical connections 80 which are screws that are electrically connected to outlet receptacle contacts 130.

FIG. 3d is a cutaway view of the present invention that has no switch or power outlet components. Although the body could resemble a power outlet, this example safety light housing 22 is shaped similar to that of a light switch. Safety light source 10 emits light through light transmission means 33. Ambient light travels through the clear or translucent body area 45 to reach the ambient light detector 40. The clear or translucent body area 45 also serves as a pushrod to actuate the on-off-test switch 50. The normally exposed area 11 of the body protrudes through a switch wall cover plate, allowing the light from the concealed safety light device to illuminate the room area.

Figure 4:
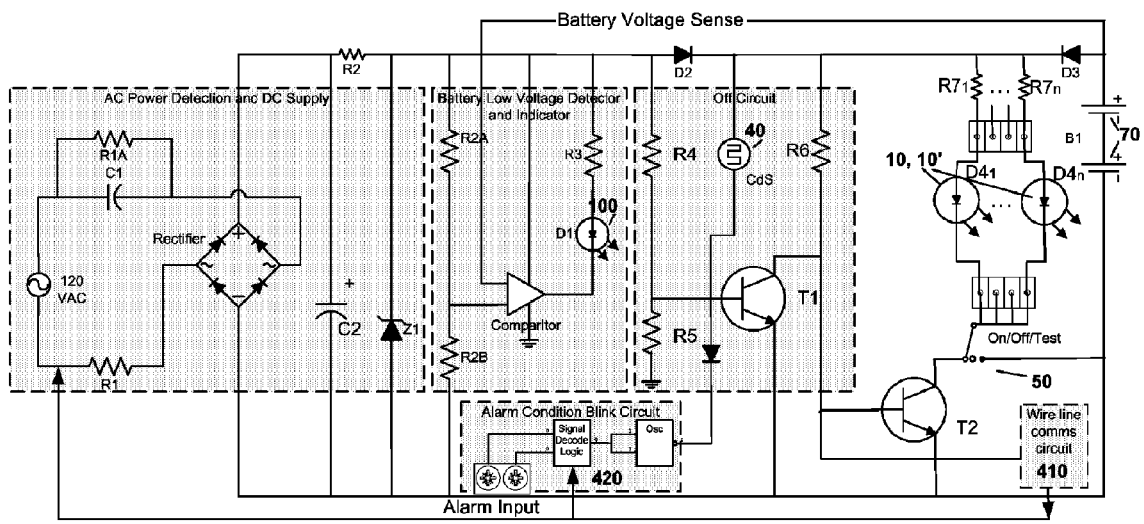
FIG. 4 is a reference design schematic diagram of a circuit of the concealed safety lighting device of the present invention. It demonstrates the various features of detecting day and night, power failures, and alarm condition and how they may be implemented.
Figure 6A:
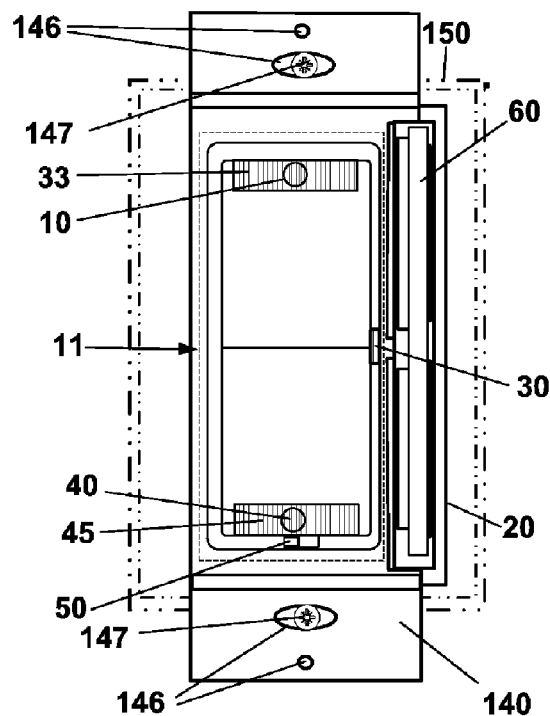
FIGS. 6A, 6B and 6C depict the concealed safety lighting device in the form of a decorative version of a wall switch, similar to the classic version depicted in FIGS. 1A, 1B and 1C.
Figure 6B:
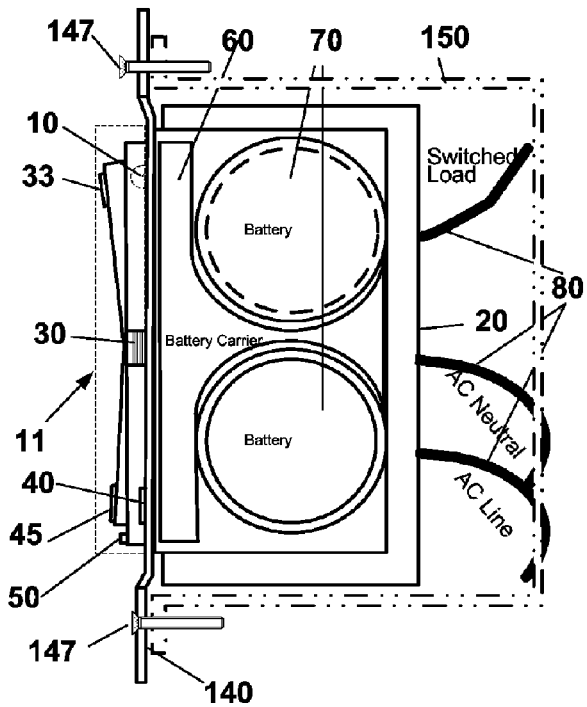
Figure 6C:
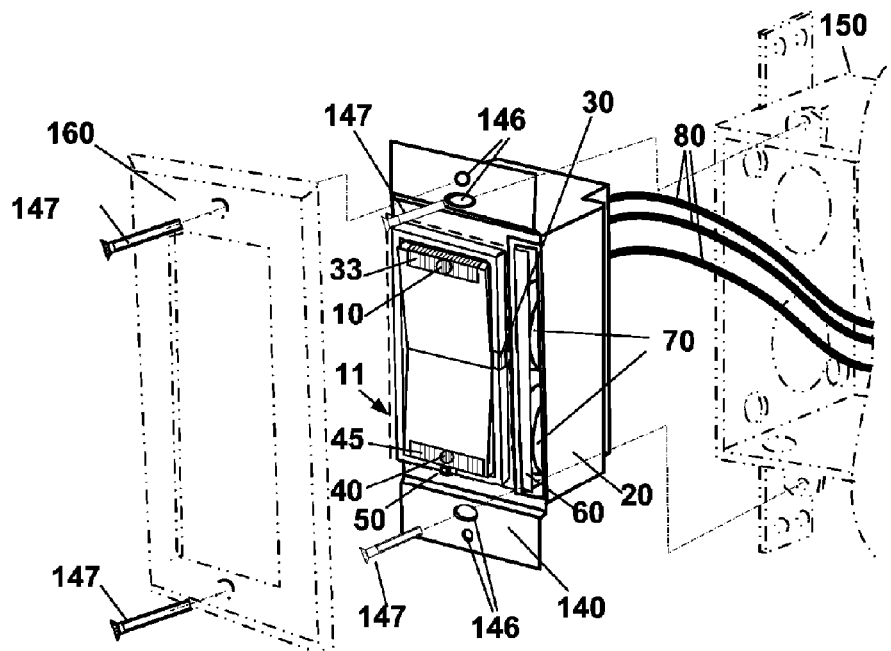

Emergency Lighting and AC Detection Circuit Operation Description. The following describes one design of how the alternate safety lighting detection and actuation reference design circuitry operate to provide necessary function as described in the present invention. Referring to FIG 4: AC Power Detection and DC Supply: This circuit represents a common transformer-less low power DC power supply design and may be implemented in other ways without impacting the scope of this present invention.

Battery Low Voltage Detector: Many devices are currently available to detect a voltage threshold and activate an indicator. This is one design to demonstrate how the present invention is able to incorporate the function. This circuit is optional and may be omitted without impacting the scope of the present invention. Diode D3 prevents charging of replaceable batteries and is replaced with a current limiting and charging mechanism when using rechargeable batteries as in the whole house system module 700.

Off Circuit: In this example power-signal circuit, transistor T1 is held in the on state through resistor divider network R4 and R5 as long as AC is available. The output of T1 will keep the safety light source 10, in this reference example (LED D4), in the off state by turning off transistor T2. Current flow while AC power is applied is supplied through D2 through R6, through T1. In this reference example, ambient light detector 40 (CdS) has no function when AC power is on since R4 will hold T1 on, T2 off and safety light source 10 LED D4 off.

When AC power is unavailable, transistor T1 will control the brightness of the safety light source 10 (LED D4) through the ambient light detector 40, (CdS) which will develop a lower resistance as more light is detected This raises the bias voltage on the base of transistor T1 with respect to the amount of ambient light detected, thereby turning off D4 and reducing current drain on the alternate power source battery 70 (B1) to extend its useable life.

When AC power is available, transistor T1 can optionally be used to control the brightness of the safety light source 10, (LED D4) through the ambient light detector 40, CdS and to provide a night light function by changing the value of the bias voltage at the base of T1 to a value that allows transistor T1 to turn off when a predetermined light level is reached.

Lighting control: The safety light source 10, in this reference example a light emitting diode, D4 will remain off while transistor T2 is off. Resistor $R7_1$ through $R7_n$ limits the amount of current through the LEDs and is chosen to optimize light output and battery life. The optional on-off-test switch 50 will allow the safety light source 10 (LED $D4_1$ thru $D4_n$) to be deactivated. The low voltage detector circuit is designed into the circuit in such a way as to trigger the low battery warning indicator 100 (D1) when AC power is present and the battery voltage falls below a certain voltage determined by the resistor divider R2A and R2B.

Alarm Condition Blink Circuit: Receiving a coded signal or closing the circuit at the Alarm Input terminals causes the signal decode logic 420 to enable the oscillator circuit to intermittently pull down the base of T1 regardless of the state of the ambient light detector 40 or the state of AC power. This signal allows transistor T2 to turn current on and off through the safety light source 10 (LED $D4_1$ thru $D4_n$) causing said safety light source to blink in response to the alarm condition. The wire line comms circuit 410 sends a coded signal out over the primary power lines through AC power supply cord 750 when embodied in a remote system module 700.

The above circuit description is a reference design to indicate how one implementation can provide the necessary feature and function of the described present invention.

FIGS. 5a through 6C show two additional embodiments in decorative model form factors of electrical wiring devices. The description of operation for these two embodiments is identical to that found in FIGS. 1a through 2C and are shown here as examples of different embodiments of the present invention.

FIG. 7 shows another embodiment of the concealed system as a whole house unit where the safety light source 10 is mounted in the switch device housing 20 and outlet device housing 21 and the safety light housing 22. The safety light housing 22 is the housing in the form substantially similar to a classic light switch as shown in FIG. 1a through 1c, but contains no switch functionality. The light sensor 740 is electrically coupled to the system module 700 through wire 745 to allow the system module 700 to monitor ambient light levels. Light sensor 740 may be mounted any place that the user determines to sample light levels effectively. An alternate power source battery 770 is located in a single system module 700 that is electrically coupled to each of the safety light sources 10 using in this example a pair of wires as a safety light power signal circuit 760. A coded signal transmitted over the primary power wiring or on the alarm input terminals 780 into the signal decode logic 420 causes the system module 700 to flash all the connected safety light sources 10 on and off until the alarm condition is removed. The wire line comms circuit 410 shown in FIG. 4 sends an electronic coded signal through the power supply cord 750 to remotely turn on safety lights in those concealed safety lights that have local power available. The circuit board 790 contains the logic and circuitry necessary to provide all the functions of the present invention and is detailed in FIG. 4. System module 700 monitors AC power through the AC power supply cord 750 which plugs into utility supplied AC power. AC power supply cord 750 supplies power to the System module 700 which converts high voltage AC to low voltage DC power. When this DC power is interrupted due to a power failure or any other reason, the logic on circuit board 790 signals the safety light source 10 in each concealed safety light to emit light using power from the alternate power source battery 770.

From the above description it can be seen that the concealed safety lighting device provides safety light in several ways including general night lighting, power failure lighting, and an alarm condition visual indication. The safety lighting mechanism and components can be completely integrated into electrical wiring devices, or distributed as separate modules and in electrical communication with the safety lighting device concealed in electrical wiring devices from a remote safety lighting mechanism. The safety lighting mechanism is capable of being constructed in a small enough form factor to integrate the light source and the backup safety light mechanism into standard AC electrical switches and outlets to overcome the shortcomings of prior art devices.

A concealed safety lighting device that provides safety lighting in a concealed or inconspicuous way is described. It is capable of providing night lighting and alarm condition alerts, and is able to detect the occurrence of a power failure and provide backup safety lighting upon detection of the power failure. The backup safety light mechanism includes an alternate power source which can take the form of, but is not limited to non-rechargeable batteries or rechargeable batteries with sufficient power density to provide a useful lighting period during utility supplied AC power failures. The backup safety light mechanism also includes an ambient light detector for extending the life of the battery and turning off the nightlight feature during the day, and an optional on-off user control switch for selectively turning the safety light off when not needed. Furthermore, the concealed safety lighting device of the present invention is simple and easy to install and use, and is economical to manufacture.

While certain novel features of this invention have been shown and described using exemplary preferred embodiments, the scope of the invention is not intended to be limited to the details above, since it will be understood that various omissions, modifications, substitutions and changes in the forms and details of the device illustrated and in its operation can be made by those skilled in the art without departing in any way from the spirit of the present invention. Therefore, the scope of the claims should be accorded the broadest interpretation so as to encompass all such modifications and similar arrangements.

The invention claimed is:

1. A concealed safety lighting device comprising:
   a) a housing having a size and shape of an electric wiring device selected from the group consisting of a switch, dimmer and power outlet, said housing further including a mounting means adapted to affix said housing to an electrical utility work box, said mounting means further comprising a means to affix a conventional cover plate for said electric wiring device;
   b) a light source adapted such that the light emitted from said light source is transmitted through a visible surface area of said housing as a means to illuminate the area adjacent to said safety lighting device, said visible surface area protruding into, and exposed through, said conventional cover plate;
   c) a power-signal means adjusting the power level of said light source, said power-signal means providing an electrical power signal to energize said light source.

2. The concealed safety lighting device of claim 1, wherein said power-signal means further comprises:
   a) a power failure detection means, connected to a primary power supply, arranged to provide detection and signaling of a power failure of said primary power supply;
   b) a connection means adapted to provide an electrical connection to an alternate power source, said alternate power source comprised of a battery;
   c) an actuator means arranged to electrically switch the power source for said light source to said connection means when activated by said power failure detection means;

whereby said power-signal means provides an electrical power signal to said light source to emit light during a power failure, thereby causing said concealed safety lighting device to perform as an emergency backup lighting device.

3. The concealed safety lighting device of claim 1, wherein said power-signal means further comprises a light detection means adapted to monitor light levels, wherein said light detection means is arranged to reduce or increase power to said light source in response to changes in light levels.

4. The concealed safety lighting device of claim 1 wherein said power-signal means is further comprised of a user interface switching mechanism, whereby said user interface switching mechanism adjusts the level of power to said light source.

5. The concealed safety lighting device of claim 1 wherein said power-signal means derives low voltage direct current from a primary power supply to illuminate said light source when said primary power supply is available.

6. The concealed safety lighting device of claim 1 wherein said power-signal means comprises one or more separable distributed components in communication with each other to control the power level of said light source.

7. The concealed safety lighting device as in claim 1 wherein said power-signal means comprises signal input communication means for communicating with an external system that generates a signal when a predetermined condition exists, said power-signal means providing a power signal to said light source in response to the externally generated signal.

8. The concealed safety lighting device of claim 1, wherein said housing further comprises mechanical and electrical components of said electrical wiring device, whereby said safety lighting device illuminates a darkened room area while simultaneously providing the function of said electrical wiring device.

9. The concealed safety lighting device of claim 1 wherein said housing further comprises a compartment to contain an alternate power source, said alternate power source capable of providing low voltage direct current.

10. The concealed safety lighting device of claim 9 wherein said alternate power source is further comprised of a removable non electrically conductive battery carrier, whereby said battery carrier electrically isolates a user from a high voltage primary power source when said battery carrier is handled by said user.

11. The concealed safety lighting device of claim 1 wherein said housing further comprises a light transmission means selected from the group consisting of a void, lens, transparent material, translucent material, light pipe, and fiber optic material, said light transmission means arranged to convey light from said light source through said visible surface area of said safety lighting device.

12. A method of providing safety lighting without indicating that an area is so equipped by concealing a safety lighting device in said area, wherein the step of concealing said safety lighting device comprises:
  a) combining a light source with a housing, having a suitable shape and mounting means to install in an electrical workbox and attach a conventional cover plate;
  b) adjusting the power level of said light source using an electric signal;
  c) conveying light from said light source through a visible surface area of said housing utilizing a light transmission means to convey light emitted from said light source into said area, said light transmission means selected from the group consisting of a void, lens, transparent material, translucent material, light pipe, and fiber optic material;
whereby said safety lighting device is concealed by installing in an electrical utility work box and covered by a conventional cover plate.

13. A method of claim 12, wherein the step of adjusting the power level of said light source further comprises the steps of:
  a) sensing primary power using a power-sensing signal circuit connected to a primary power source, thereby detecting the occurrence of a power failure;
  b) electrically connecting said light source to an alternate power source when power failure is detected;
thereby adjusting the power level of said light source in said housing upon detection of power failure.

14. The method of claim 12 wherein the step of adjusting the power level of said light source further comprises the steps of:
  a) monitoring light conditions in a selected area;
  b) increasing power to said light source to provide safety lighting at a predetermined light level;
  c) reducing power to said light source when predetermined light levels exist.

15. The method of claim 12 wherein the step of adjusting the power level of said light source includes the step of providing a night light function further comprising the steps of:
  a) monitoring light conditions in a selected area;
  b) using primary power to supply power to said light source;
  c) increasing power to said light source when predetermined low light levels exist in said area adjacent to said safety lighting;
  d) reducing power to said light source when predetermined light levels exist in said area adjacent to said safety lighting;
thereby providing illumination while primary power is available.

16. The method of claim 12 wherein the step of adjusting the power level of said light source further comprises the step of varying the level of power to said light source in response to a user interface switching mechanism to provide user-level control of adjusting the power to said light source.

17. The method of claim 12 wherein the step of adjusting the power level of said light source further includes the step of monitoring a signal generated by an external alarm system and varying the power to said light source in response to said signal, said external alarm system further monitoring predetermined safety conditions.

18. A concealed safety lighting device comprising:
  a) a housing formed such that it fits within an electrical workbox;
  b) said housing further comprising a mounting means adapted to affix said housing to an electrical utility work box;
  c) said mounting means further comprising a means to affix a conventional cover plate for a conventional electric wiring device;
  d) said housing having a visible surface area, said visible surface area exposed through said conventional cover plate;
  e) a light source adapted such that the light emitted from said light source is transmitted and conveyed through said visible surface area of said housing as a means to illuminate objects in the area adjacent to said safety lighting device;
  f) an electrical power supply adapted to connect to said light source, said electrical power supply derived from a primary or secondary power source;
  g) a signal means to cause said electrical power supply to connect to said light source, said signal means activated by a predetermined condition;
whereby said safety lighting device provides illumination of the room area and objects located in the nearby room area when a predetermined condition exists.

* * * * *